(12) United States Patent
Kim et al.

(10) Patent No.: US 11,114,686 B2
(45) Date of Patent: Sep. 7, 2021

(54) SECONDARY BATTERY INCLUDING ELECTRODE LEAD EXPOSED WITHIN THE SEALING PART AND METHOD FOR MANUFACTURING THE SAME

(71) Applicant: LG Chem, Ltd., Seoul (KR)

(72) Inventors: Sang Hun Kim, Daejeon (KR); Yong Su Choi, Daejeon (KR); Hyung Kyun Yu, Daejeon (KR); Soo Ji Hwang, Daejeon (KR); Na Yoon Kim, Daejeon (KR); Yong Kim, Daejeon (KR)

(73) Assignee: LG Chem, Ltd.

( * ) Notice: Subject to any disclaimer, the term of this patent is extended or adjusted under 35 U.S.C. 154(b) by 500 days.

(21) Appl. No.: 16/066,792

(22) PCT Filed: Aug. 29, 2017

(86) PCT No.: PCT/KR2017/009449
§ 371 (c)(1),
(2) Date: Jun. 28, 2018

(87) PCT Pub. No.: WO2018/070660
PCT Pub. Date: Apr. 19, 2018

(65) Prior Publication Data
US 2019/0020052 A1    Jan. 17, 2019

(30) Foreign Application Priority Data

Oct. 14, 2016 (KR) .................. 10-2016-0133815

(51) Int. Cl.
*H01M 10/04*      (2006.01)
*H01M 50/10*      (2021.01)
(Continued)

(52) U.S. Cl.
CPC ........... *H01M 10/04* (2013.01); *H01M 50/10* (2021.01); *H01M 50/172* (2021.01); *H01M 50/183* (2021.01); *H01M 50/531* (2021.01)

(58) Field of Classification Search
None
See application file for complete search history.

(56) References Cited

U.S. PATENT DOCUMENTS

| 5,948,562 A | 9/1999 | Fulcher et al. |
| 6,387,566 B1 | 5/2002 | Chang et al. |

(Continued)

FOREIGN PATENT DOCUMENTS

| CN | 103972431 A | 8/2014 |
| CN | 104953078 A | 9/2015 |

(Continued)

OTHER PUBLICATIONS

Chinese Search Report for Application No. CN201780006180.6 dated Jun. 9, 2020, 2 pgs.

(Continued)

*Primary Examiner* — Lucas J. O'Donnell
(74) *Attorney, Agent, or Firm* — Lerner, David, Littenberg, Krumholz & Mentlik, LLP

(57) ABSTRACT

Disclosed are a secondary battery and a method for manufacturing the same. According to the present invention, since an external protrusion protruding from the outside of an exterior constituting a body of the secondary battery as a component through which a secondary battery according to a related art is electrically connected to external electric equipment is removed, the secondary battery may be reduced in volume under the same capacity.

5 Claims, 6 Drawing Sheets

(51) Int. Cl.
  *H01M 50/172* (2021.01)
  *H01M 50/183* (2021.01)
  *H01M 50/531* (2021.01)

(56) References Cited

U.S. PATENT DOCUMENTS

| | | | |
|---|---|---|---|
| 9,859,536 | B2 | 1/2018 | Isozaki et al. |
| 2001/0051298 | A1 | 12/2001 | Hanafusa et al. |
| 2004/0029001 | A1 | 2/2004 | Yamazaki et al. |
| 2008/0305398 | A1 | 12/2008 | Komiya |
| 2011/0165452 | A1 | 7/2011 | Ahn |
| 2014/0212701 | A1 | 7/2014 | Hur |
| 2014/0255761 | A1 | 9/2014 | Kong |
| 2015/0188100 | A1 | 7/2015 | Isozaki et al. |
| 2015/0280275 | A1 | 10/2015 | Aizawa |

FOREIGN PATENT DOCUMENTS

| | | |
|---|---|---|
| EP | 0975031 A1 | 1/2000 |
| JP | H11031486 A | 2/1999 |
| JP | 2000251868 A | 9/2000 |
| JP | 2001093491 A | 4/2001 |
| JP | 2008204706 A | 9/2008 |
| JP | 2014038817 A | 2/2014 |
| JP | 2014146596 A | 8/2014 |
| JP | 2014534580 A | 12/2014 |
| JP | 2015125929 A | 7/2015 |
| KR | 20000061878 A | 10/2000 |
| KR | 100628581 B1 | 9/2006 |
| KR | 100865399 B1 | 10/2008 |
| KR | 20110081038 A | 7/2011 |
| KR | 20130047151 A | 5/2013 |
| WO | 9940634 A1 | 8/1999 |
| WO | 2013002058 A1 | 1/2013 |

OTHER PUBLICATIONS

Search report from International Application No. PCT/KR2017/009449, dated Nov. 28, 2017.
Extended European Search Report including Written Opinion for Application No. EP17859952.8 dated Jan. 7, 2019.

SECONDARY BATTERY INCLUDING ELECTRODE LEAD EXPOSED WITHIN THE SEALING PART AND METHOD FOR MANUFACTURING THE SAME

CROSS-REFERENCE TO RELATED APPLICATION

The present application is a national phase entry under 37 U.S.C. § 371 of International Application No. PCT/KR2017/009449, filed on Aug. 29, 2017, published in Korean, which claims priority from Korean Patent Application No. 10-2016-0133815, filed on Oct. 14, 2016, the disclosures of which are hereby incorporated herein by reference.

TECHNICAL FIELD

The present invention relates to a secondary battery including an electrode lead and a method for manufacturing the same, and more particularly, to a secondary battery including an electrode lead that is capable of reducing a volume of the secondary battery under the same capacity when compared to a secondary battery according to a related art and a method for manufacturing the same.

BACKGROUND ART

A secondary battery that is repetitively chargeable and dischargeable includes an electrode assembly manufactured by alternately stacking an electrode and a separator. Here, the secondary battery is configured to supply electric energy stored in the electrode assembly to external power demands. In general, the secondary battery includes an electrode lead electrically connected to the electrode assembly. The electrode lead electrically connected to the electrode assembly transmits the electric energy to the power demands such as electronic equipment and also electrically transmits (discharge) the electric energy stored in the electrode assembly again to the outside or receives (charging) electric energy from the outside.

FIG. 1 is a plan view illustrating a structure of a secondary battery including an electrode lead according to a related art, and FIG. 2 is a plan view illustrating a structure of the electrode lead according to the related art.

Referring to FIGS. 1 and 2, a secondary battery 1 may include an electrode assembly 2 and one or more electrode leads 3. Here, each of the electrode leads 3 may include an external connection part 4 electrically connected to external devices such as electronic equipment and an internal connection part 6 electrically connected to the electrode assembly 2. Also, the electrode lead 3 may include an insulation part 5 disposed between the external connection part 4 and the internal connection part 6 and surrounded by an insulation film 7. Since the insulation part 5 is provided, an inner space of the secondary battery may be sealed from the outer space to improve stability of the electrode assembly 2.

As described above, the electrode lead 3 of the secondary battery 1 according to the related art may include the internal connection part 6 and the external connection part 4. As illustrated in FIGS. 1 and 2, each of the external connection part 4 and the internal connection part 6 may have a shape that protrudes from a boundary of the secondary battery 1. Particularly, since the external connection part 4 protrudes to an outer space of the secondary battery 1 to increase an overall volume of the secondary battery 1. Also, since the internal connection part 6 protrudes to an inner space of the secondary battery 1, the electrode assembly 2 mounted in the inner space of the secondary battery 1 may be reduced in size, and therefore, the secondary battery 1 may be reduced in capacity.

DISCLOSURE OF THE INVENTION

Technical Problem

Therefore, an object of the present invention is to provide a secondary battery having improved capacity per unit volume by improving a structure of the secondary battery, particularly, an electrode lead when compared to the secondary battery according to the related art.

Technical Solution

According to an aspect of the prevent invention for achieving the abovementioned object, a secondary battery includes: an electrode assembly including an electrode and a separator;
an exterior accommodating the electrode assembly; and one or more electrode leads connected to the electrode assembly, wherein each of the electrode leads includes: an insulation part that is an area surrounded by the exterior; and an exposure part that is an area, which is not surrounded by the exterior, wherein at least a portion of the exposure part is disposed inside the insulation part.

The electrode lead may further include a connection part connected to the electrode assembly, and the connection part may be disposed in an inner space defined by the exterior.

The exposure part may be disposed within the outermost edge of the exterior.

An insulation member may be disposed between the electrode lead and the exterior, and each of the exterior and the insulation member may have through-holes in positions corresponding to a position of the exposure part, respectively.

The exterior may include: an exterior body forming a body of the exterior; and a sealing part sealing an inner space defined by the exterior from an outer space of the exterior, and the exposure part may be disposed inside the sealing part.

The electrode lead may further include a connection part connected to the electrode assembly, and the connection part may be disposed inside the sealing part.

The sealing part may be folded by using a folding part, which is a boundary between the exterior body and the sealing part, as an axis.

According to another aspect of the prevent invention for achieving the abovementioned object, a method for manufacturing a secondary battery includes: a step of accommodating the electrode assembly in the exterior; an insulation step of surrounding an electrode lead connected to the electrode assembly by using the exterior to form an insulation part formed by the exterior on the electrode lead; and a notching step of removing a portion of the insulation part to form an exposure part, which is an area that is not surrounded by the exterior, on the electrode lead, wherein, in the notching step, at least a portion of the exposure part is formed inside the insulation part.

The electrode lead may include a connection part connected to the electrode assembly, the connection part may be formed in an inner space formed by the exterior, and the method may further include a connection step of connecting the connection part to the electrode assembly.

In the notching step, the exposure part may be disposed within the outermost edge of the exterior.

An insulation member may be disposed between the electrode lead and the exterior, and in the notching step, each of the exterior and the insulation member may have through-holes in positions corresponding to a position of the exposure part.

The exterior may include: an exterior body forming a body of the exterior; and a sealing part sealing an inner space defined by the exterior from an outer space of the exterior, and in the notching step, the exposure part may be formed inside the sealing part.

The electrode lead may include a connection part connected to the electrode assembly, the connection part may be formed inside the sealing part, and the method may further include a connection step of connecting the connection part to the electrode assembly.

The electrode lead may be disposed between the sealing parts, and the method may further include a folding step of folding the sealing part by using a folding part, which is a boundary between the exterior body and the sealing part, as an axis.

In the connection step, the connection part and the electrode assembly may be connected to each other through welding.

Advantageous Effects

The object to be achieved of the present invention may be to provide the secondary battery having the improved capacity per unit by improving the structure of the secondary battery, particularly, the electrode lead when compared to the secondary battery according to the related art.

MODE FOR CARRYING OUT THE INVENTION

Hereinafter, a secondary battery according to an embodiment of the present invention will be described with reference to the accompanying drawings. While the embodiments of the present invention have been described with reference to the specific embodiments, it will be apparent to those skilled in the art that various changes and modifications may be made without departing from the spirit and scope of the invention as defined in the following claims.

Structure of Secondary Battery

Figure 3:
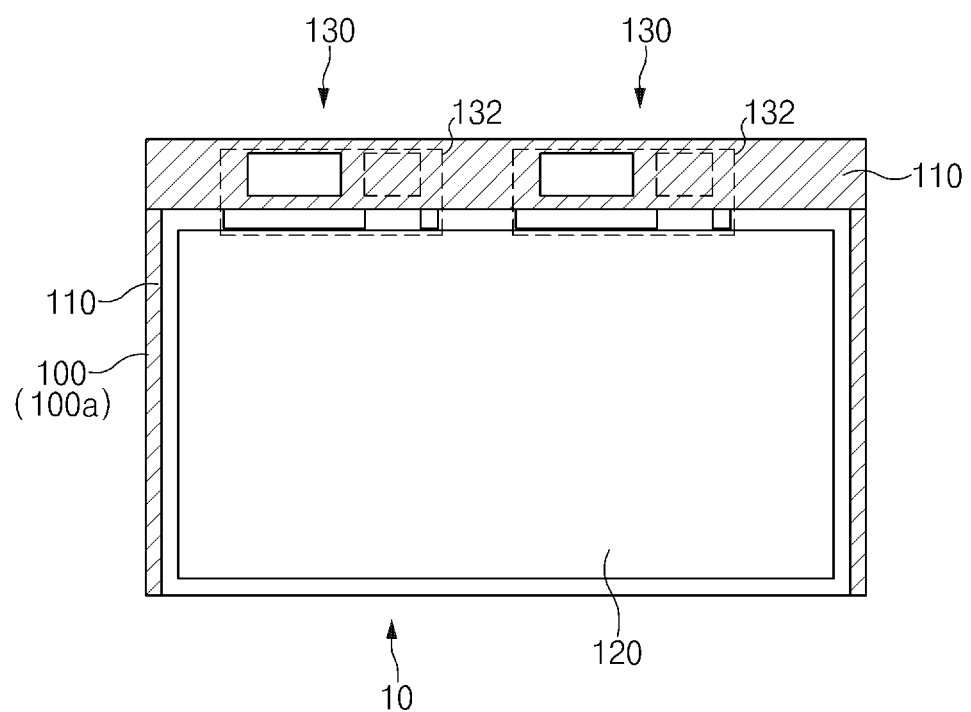
FIG. 3 is a plan view illustrating a structure of a secondary battery including an electrode lead according to an embodiment of the present invention.

FIG. 3 is a plan view illustrating a structure of a secondary battery including an electrode lead according to an embodiment of the present invention.

Referring to FIG. 3, a secondary battery 10 according to an embodiment of the present invention may include an electrode assembly 120 including an electrode and a separator (not shown), an exterior 100 accommodating the electrode assembly 120, and one or more electrode leads 130 connected to the electrode assembly 120. The electrode assembly 120 may be provided in an inner space formed by the exterior 100. Also, although two electrode leads 130 are provided in FIG. 3, the technical ideas of the present invention are not limited thereto. In case in which one or more electrode leads 130 are provided, at least a portion of the electrode leads may be connected to a negative electrode tab (not shown) of the electrode assembly 120, and the other electrode lead may be connected to a positive electrode tab (not shown) of the electrode assembly 120. The electrode lead may be one of aluminum, copper, nickel, and nickel-plated copper.

In this specification, the term "connection" means that electric energy is exchanged between components. Thus, the components described herein as being connected may be directly connected to each other, but the components may be indirectly connected by another component as long as the components exchange electric energy with each other.

The exterior 100 constituting a body of the secondary battery 10 may be a pouch. That is, the secondary battery according to an embodiment may be a pouch-type secondary battery. However, the present invention is not limited thereto and thus be applied irrespective of the nature of the exterior as long as the exterior seals the electrode assembly 120 from the outside.

As described above, the electrode lead 130 may be a component connected to the electrode assembly to supply electric energy stored in the electrode assembly 120 to the outside or supply electric energy from the outside to the electrode assembly 120. The former may be discharge, and the latter may be charge.

Figure 6:
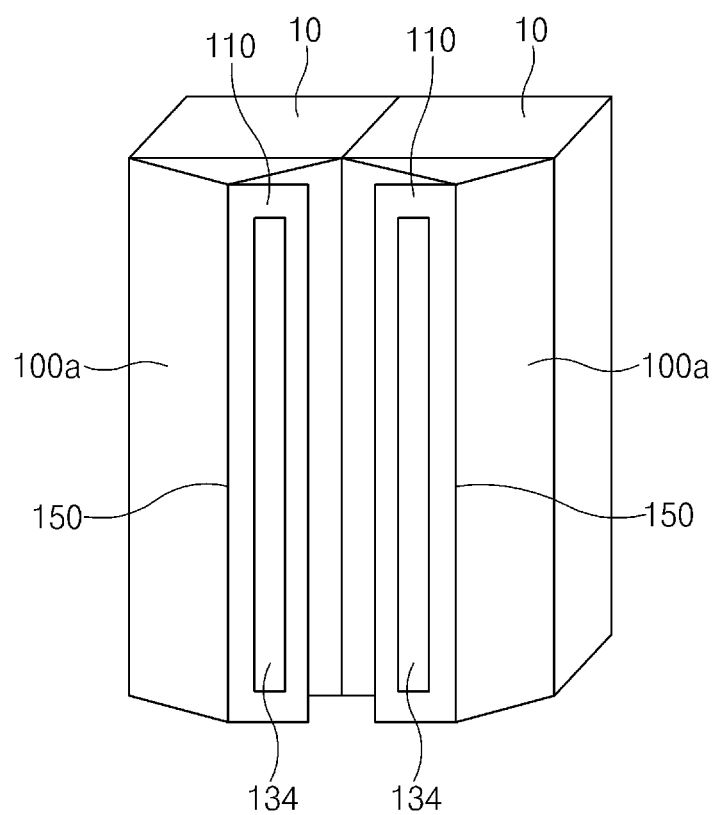
FIG. 6 is a perspective view illustrating an example of the structure of the secondary battery according to an embodiment of the present invention.

The exterior 100 may include an exterior body 100a forming a body of the exterior 100 and a sealing part 110 sealing the inner space formed by the exterior 100 from the outer space of the exterior 100. As illustrated in FIG. 3 or 6, the sealing part 110 may have a shape that protrudes from the exterior body 100a to the outside. Here, the electrode lead 130 may be disposed inside the sealing part 110 without protruding to the outside of the exterior. Since the electrode lead 130 does not protrude to the outside of the exterior, the secondary battery may be reduced in volume when compared to a secondary battery having the same capacity and may be improved in capacity per volume.

Figure 4:
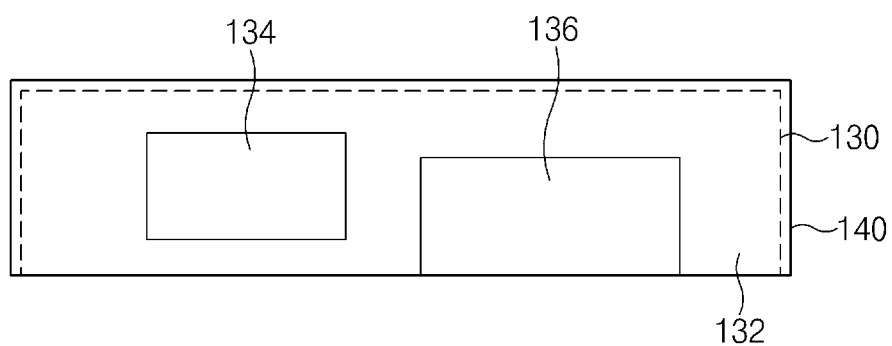
FIG. 4 is an enlarged plan view illustrating a structure of an insulation part of the electrode lead according to an embodiment of the present invention.

FIG. 4 is an enlarged plan view illustrating a structure of an insulation part of the electrode lead according to an embodiment of the present invention.

Referring to FIGS. 3 and 4, the electrode lead 130 of the secondary battery 10 according to an embodiment of the present invention may include an insulation part 132 that is an area, which is surrounded by the exterior 100 and is not exposed to the outer space of the exterior, and an exposure part 134 that is an area, which is not surrounded by the exterior 100 and is exposed to the outer space of the exterior 100. Although one exposure part 134 is illustrated in FIG. 4, two or more exposure parts may be provided.

Figure 5:
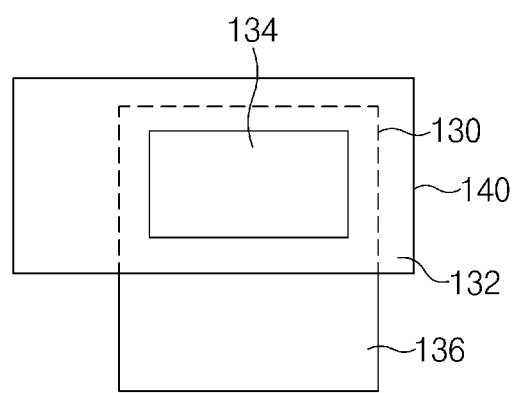
FIG. 5 is an enlarged plan view illustrating a structure of an insulation part of an electrode lead according to another embodiment of the present invention.

Also, the electrode lead 130 may further include a connection part 136 configured to be connected to the electrode assembly. As illustrated in FIG. 4, the connection part 136 may be disposed inside the insulation part 132. On the other hand, as illustrated in FIG. 5, the connection part 136 may protrude from the insulation part 132 and be disposed in the inner space formed by the exterior. Also, the connection part 136 may be connected to the electrode assembly through welding.

Figure 1:
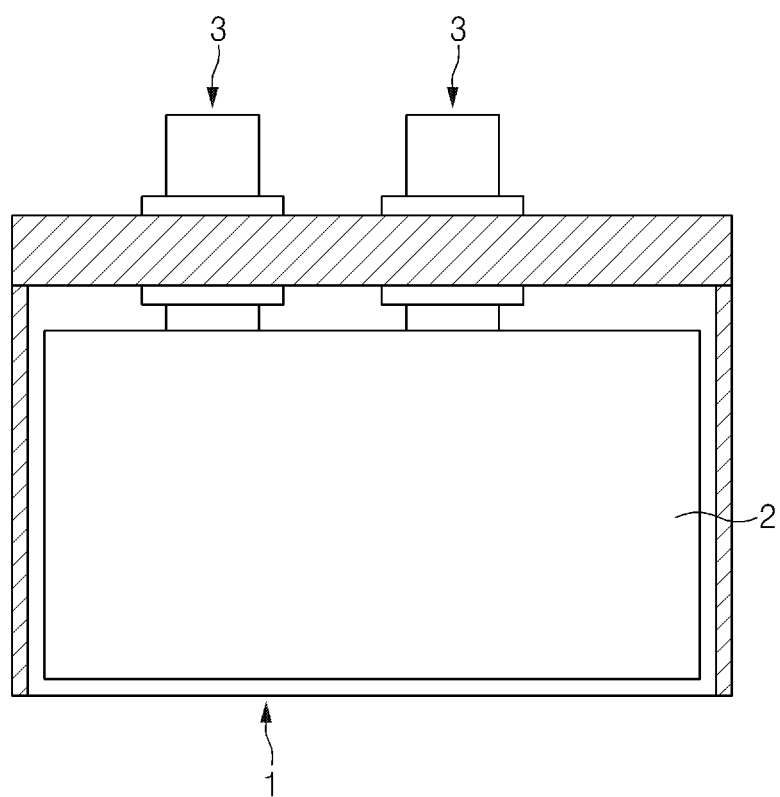
FIG. 1 is a plan view illustrating a structure of a secondary battery including an electrode lead according to a related art.
Figure 2:
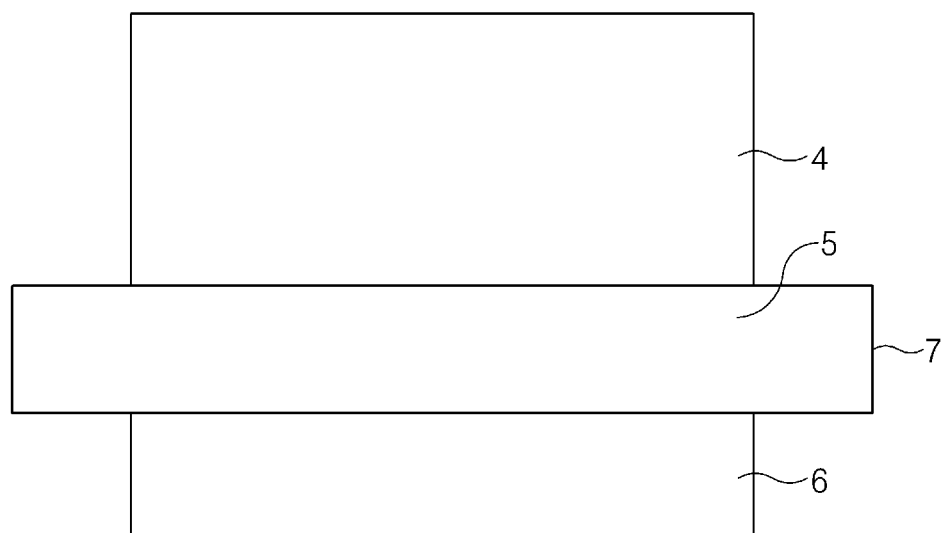
FIG. 2 is a plan view illustrating a structure of the electrode lead according to the related art.

As described above, the exposure part 134 of the electrode lead 130 according to an embodiment of the present invention may be an area that is exposed to the outer space of the exterior, and the electrode lead 130 may be disposed inside the sealing part 110. Thus, the exposure part 134 may be formed by forming a through-hole in a portion of the exterior. Also, as illustrated in FIG. 4, the exposure part 134 and the connection part 136 may be disposed inside the insulation part 132. The exposure part 134 may be connected to external electronic equipment (not shown), and the connection part 136 may be connected to the electrode assembly. As described above, when the exposure and the connection part are disposed inside the insulation part, it may be unnecessary that the electrode lead includes a separate protrusion so as to be connected to the external electronic equipment and the electrode assembly, unlike the related art. Thus, the component (the external connection part 4 of FIG. 2) protruding to the outer space of the exterior and the component (the internal connection part 6 of FIG. 2) protruding to the inner space of the exterior may be removed. Thus, the electrode assembly having a more large volume may be mounted in the exterior to reduce an overall volume of the secondary battery, thereby realizing a technical effect for improving capacity per volume of the secondary battery. Also, to maximize the capacity per volume of the secondary battery, as illustrated in FIG. 3, it is possible to prevent the electrode lead 130 from protruding to the outer space of the exterior. Here, the exposure part 134 may be disposed within the outermost edge of the exterior (see FIGS. 3 and 4).

Even though the exterior is configured to seal the inner space and the outer space of the secondary battery, sealability may be deteriorated. Particularly, in the sealing part sealed after the electrode assembly is mounted in the inner space of the exterior, the sealability of the exterior may be often deteriorated.

In this case, to improve the sealability of the secondary battery, an insulation member 140 may be disposed between the sealing parts. Particularly, as illustrated in FIG. 3, when the electrode lead 130 is disposed between the sealing parts 110, the insulation member 140 may be disposed between the electrode lead 130 and the exterior 100. As illustrated in FIG. 4, the insulation member 140 may surround the whole of the electrode lead 130. As illustrated in FIG. 5, the insulation member 140 may surround a portion of the electrode lead 130. The insulation member 140 may be an insulation film including a polymer material. For example, the insulation member 140 may include poly-olefin.

As described above, the exposure part 134 may be disposed inside the insulation part 132. For this, a through-hole may be formed in the exterior 100 or the sealing part 110. Similarly, a through-hole may be formed in the insulation member 140. Here, to form the exposure part 134, the exterior and the insulation member may have the through-holes in positions corresponding to each other, respectively. This is done because, if the through-hole of the exterior and the insulation member are disposed at the positions not corresponding to each other, an area of the electrode lead, which is exposed to the outer space of the secondary battery, may not be formed.

The electrode lead may have a plate shape. When the electrode lead has the plate shape, the exposure part 134 may be formed on a main plane that is a plane occupying the largest area of planes formed on the electrode lead. Here, the connection part may be formed on a main plane different from the main plane on which the exposure part is formed. However, on the other hand, the exposure parts may be formed on the same plane of the electrode lead.

Also, as described above, the exposure part 134 may be disposed inside of the insulation part 132 (or inside the outermost edge of the exterior 100). In detail, as illustrated in FIG. 3, the exposure part 134 may be disposed inside the sealing part 110. The connection part 136 may be disposed inside the sealing part 110 (see FIG. 4). Alternatively, the connection part 136 may not be disposed inside the sealing part 110, but be disposed in the inner space formed by the exterior (see FIG. 5).

FIG. 5 is an enlarged plan view illustrating a structure of an insulation part of an electrode lead according to another embodiment of the present invention.

In FIG. 5, an exposure part 134 may be disposed inside a sealing part (or an insulation part 132), and a connection part 136 may be disposed in an inner space formed by an exterior except for the inside of the sealing part. However, another embodiment of the present invention may the same as the abovementioned embodiment of the present invention in that the exposure part 134 is disposed inside the insulation part 132, which is an area that is not exposed to an outer space of the exterior 100, as an area surrounded by the exterior 100.

According to an embodiment of the present invention, the exposure part may be disposed inside the insulation part (or disposed inside the sealing part). Thus, the technical effect of reducing the volume of the secondary battery has been described above. Nevertheless, when the sealing part protruding from the exterior body is provided, there is a problem that the secondary battery increases in volume.

FIG. 6 is a perspective view illustrating an example of the structure of the secondary battery according to an embodiment of the present invention.

To solve the problem due to the sealing part protruding from the exterior body, according to an embodiment of the present invention, the sealing part 110 may be folded. That is, as illustrated in FIG. 6, the sealing part 110 may be folded by using a folding part 150, which is a boundary between the exterior body 100a and the sealing part 150, as an axis. This is understood as a case in which the exterior body 100a is folded by using the folding part 150 as an axis. The sealing part may be folded to minimize the protruding of the sealing part from the exterior body, thereby more reducing the volume of the secondary battery.

Hereinafter, a method for manufacturing the secondary battery according to the present invention will be described with reference to the above-described contents and the accompanying drawings.

Method for Manufacturing Secondary Battery

An exposure part according to the present invention may be formed by removing a portion of an insulation part after the insulation part is formed first. A process of forming the exposure part by removing a portion of the insulation part is referred to as notching.

An arranged order of following steps in the method for manufacturing the secondary battery may be arbitrary, and the processes of manufacturing the secondary battery may not be limited to the arranged order of the steps. This may be equally applied to interpretation of claims.

Here, the method for manufacturing the secondary battery according to an embodiment of the present invention may include: a step of preparing an electrode assembly including an electrode and a separator and an exterior accommodating the electrode assembly; a step of accommodating the electrode assembly in the exterior; an insulation step of surrounding an electrode lead connected to the electrode assembly by using the exterior to form an insulation part, which is an area formed by the exterior, on the electrode lead; and a notching step of removing a portion of the insulation part to form an exposure part, which is an area that is not surrounded by the exterior, on the electrode lead.

Here, in the notching step, at least a portion of the exposure part may be formed inside the insulation part. Also, in the notching step, a portion of the exposure part may be formed in the inner space formed by the exterior, and the exposure part may be disposed within the outermost edge of the exterior.

Also, the insulation member may be disposed between the electrode lead and the exterior. Here, in the notching step, each of the exterior and the insulation member may have through-holes in positions corresponding to the position of the exposure part. That is, in the notching step according to an embodiment of the present invention, a portion of the insulation member as well as the portion of the exterior may also be removed. When the electrode lead is surrounded by the insulation member and the exterior, since after all of a portion of the insulation member and a portion of the exterior are removed, a portion of the electrode lead may be exposed to the outside.

Also, the exterior may include an exterior body forming a body of the exterior; and a sealing part sealing the inner space formed by the exterior from the outer space of the exterior. Here, in the notching step, the exposure part may be formed inside the sealing part.

Also, the method for manufacturing the secondary battery according to an embodiment of the present invention may further include a connection step of connecting the connection part formed on the electrode lead to the electrode assembly. Here, the connection part may be formed inside the sealing part. In the connection step, the connection part may be connected to the electrode assembly through welding.

Also, the method for manufacturing the secondary battery according to an embodiment of the present invention may further include a folding step of folding the sealing part by using a folding part, which is a boundary between the exterior body and the sealing part, as an axis.

The invention claimed is:

1. A secondary battery comprising:
   an electrode assembly comprising an electrode and a separator;
   an exterior accommodating the electrode assembly, the exterior including an exterior body and a sealing part sealing an inner space defined by the exterior body; and
   one or more electrode leads connected to the electrode assembly,
   wherein each of the electrode leads comprises:
      an insulation part that is an area surrounded by the exterior;
      an exposure part disposed inside the sealing part and inside the insulation part and having an area that is exposed to an outside of the exterior, the area of the exposure part being configured to electrically connect with a component exterior to the secondary battery; and
      a connection part connecting the electrode assembly with the exposure part and disposed inside the insulation part, the connection part extending in a first direction from the electrode assembly into the sealing part, the exposure part extending in a second direction from the connection part to the area that is exposed to the outside of the exterior, the second direction being perpendicular to the first direction;
   wherein at least a portion of the exposure part is disposed inside the insulation part,
   wherein the electrode lead does not protrude to the outside of the exterior, and
   wherein the insulation part surrounds an entirety of the exposure part and the connection part.

2. The secondary battery of claim 1, wherein the connection part is disposed in an inner space defined by the exterior.

3. The secondary battery of claim 1, wherein the exposure part is disposed within the outermost edge of the exterior.

4. The secondary battery of claim 1, wherein an insulation member is disposed between the electrode lead and the exterior, and each of the exterior and the insulation member has through-holes in positions corresponding to a position of the exposure part, respectively.

5. The secondary battery of claim 1, wherein the sealing part is folded by using a folding part, which is a boundary between the exterior body and the sealing part, as a folding axis about which an entirety of the sealing part is rotated relative to the exterior body, such that a plane of the exposure part is oriented transverse to a plane of the electrode assembly.

* * * * *